(12) United States Patent
Simon et al.

(10) Patent No.: US 8,505,831 B2
(45) Date of Patent: Aug. 13, 2013

(54) ENERGY ALERT POWER SYSTEM AND METHOD

(75) Inventors: Timothy M. Simon, San Francisco, CA (US); Blaine M. Smith, Portland, OR (US); Matthew T. Fisher, Reno, NV (US)

(73) Assignee: Tim Simon, Inc., San Francisco, CA (US)

( * ) Notice: Subject to any disclaimer, the term of this patent is extended or adjusted under 35 U.S.C. 154(b) by 1291 days.

(21) Appl. No.: 12/027,791

(22) Filed: Feb. 7, 2008

(65) Prior Publication Data
US 2008/0185451 A1 Aug. 7, 2008

Related U.S. Application Data

(60) Provisional application No. 60/888,681, filed on Feb. 7, 2007.

(51) Int. Cl.
*G08C 23/00* (2006.01)
*G08C 19/12* (2006.01)
*F25B 1/00* (2006.01)

(52) U.S. Cl.
USPC ............................ 236/51; 62/230; 340/870.17

(58) Field of Classification Search
USPC ................. 307/35, 39, 31; 236/51; 700/276, 700/295, 296, 297; 340/870.17
See application file for complete search history.

(56) References Cited

U.S. PATENT DOCUMENTS

| | | | | |
|---|---|---|---|---|
| 3,906,242 | A * | 9/1975 | Stevenson | 307/38 |
| 5,880,677 | A * | 3/1999 | Lestician | 340/3.1 |
| 6,650,249 | B2 | 11/2003 | Meyer et al. | |
| 6,671,586 | B2 | 12/2003 | Davis et al. | |
| 6,853,291 | B1 * | 2/2005 | Aisa | 340/3.3 |
| 6,965,818 | B2 * | 11/2005 | Koenig et al. | 701/36 |
| 6,975,958 | B2 * | 12/2005 | Bohrer et al. | 702/130 |
| 7,236,908 | B2 | 6/2007 | Timko et al. | |
| 7,423,546 | B1 * | 9/2008 | Aisa | 340/679 |
| 2002/0174210 | A1 * | 11/2002 | Halcomb et al. | 709/223 |
| 2007/0271006 | A1 | 11/2007 | Golden et al. | |
| 2008/0011864 | A1 | 1/2008 | Tessier et al. | |

\* cited by examiner

*Primary Examiner* — Khoa Huynh
*Assistant Examiner* — Timothy K Trieu
(74) *Attorney, Agent, or Firm* — James F. Hann; Haynes Beffel & Wolfeld LLP

(57) ABSTRACT

An energy control system, helping to reduce energy consumption from an energy grid, includes a power meter which receives first power-save signal and generates a second power-save signal for receipt by a control device. The target temperature of a thermostat is changed for a period of time in response to the second power-save signal. The control device can create a third power-save signal for receipt by a power-save adapter for an associated energy-consuming unit to permit only limited operation of the energy-consuming unit.

25 Claims, 2 Drawing Sheets

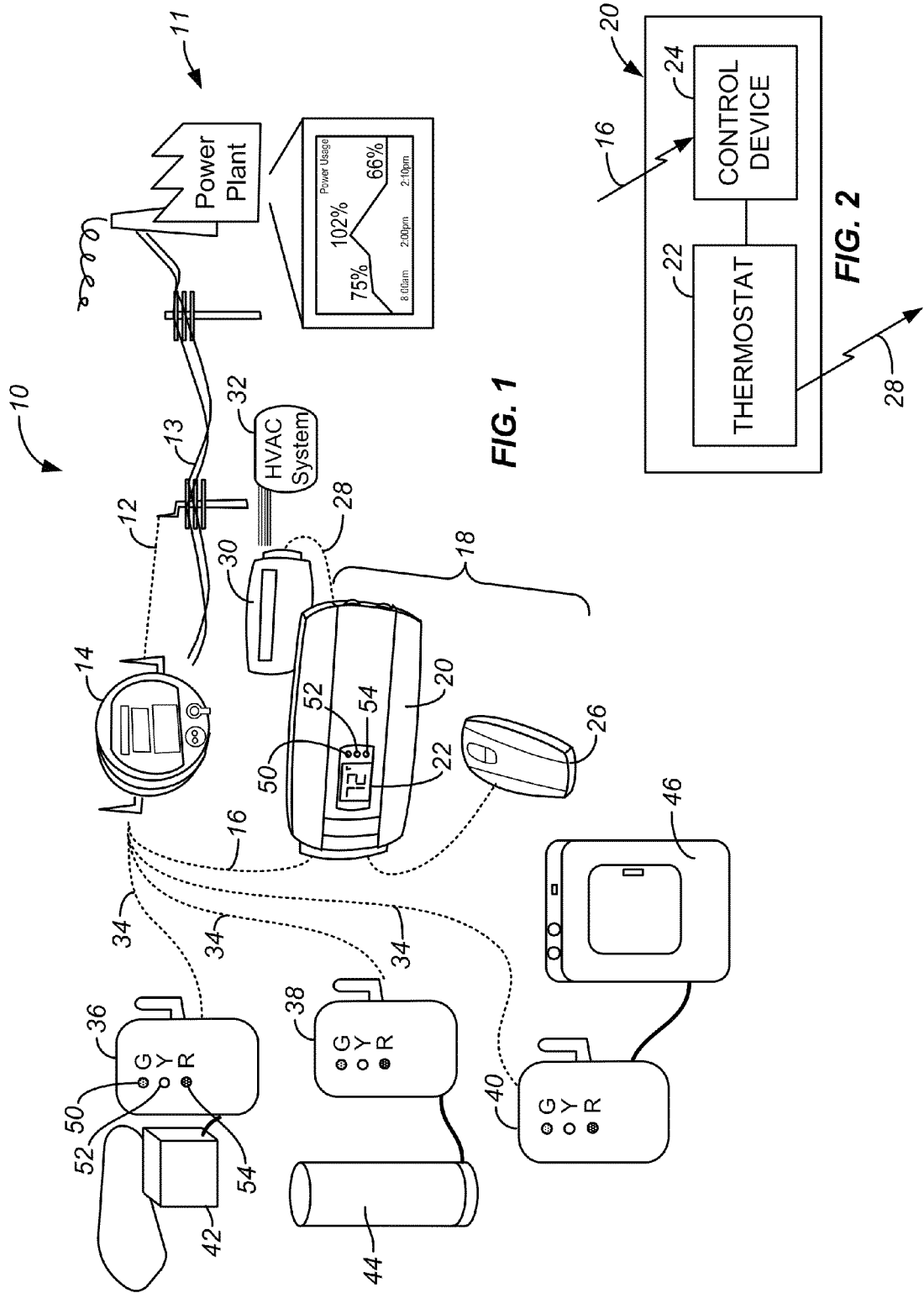

ENERGY ALERT POWER SYSTEM AND METHOD

CROSS-REFERENCE TO RELATED APPLICATIONS

This patent application claims the benefit of provisional patent application No. 60/888,681, filed 7 Feb. 2007, entitled Energy Alert Power System and Method.

BACKGROUND OF THE INVENTION

Conventional thermostats are commonly used to control furnaces and/or air conditioners. One conventional thermostat sold by Home Depot of Atlanta, Ga. as the RiteTemp® 6020Z controls the furnace/air-conditioner (HVAC) using a low power radio transmitter. In addition, this thermostat can be used in a system to receive information from and provide signals to other devices such as alarm systems, outside lighting, etc. A similar system having additional features and capabilities is disclosed in U.S. patent application Ser. No. 11/335,155 filed on 19 Jan. 2006, entitled MULTIPLE THERMOSTAT INSTALLATION; this application was published on 7 Sep. 2006 as publication number US-2006-0196953-A1, the disclosure of which is incorporated by reference.

During peak power demands a power company needs to have users on the power grid cut back on power consumption to avoid blackouts. One known way to do this is to send a signal to a specially designed power meter that a power-save state exists. The power meter receives the power-save signal and instructs the air-conditioner to increase the target temperature without delay by, for example, 4° F., the power-save state. In exchange for permitting the power company to have such temporary control, the user will typically receive power at a reduced rate structure.

BRIEF SUMMARY OF THE INVENTION

A first example of a method for temporarily reducing energy demand from an energy grid is carried out as follows. A first power-save signal is transmitted to a remotely accessible power device through which power is supplied to a user. The first power-save signal transmitting step occurs before a need to reduce power consumption. The first power-save signal is received by the power device of the user. A second power-save signal is transmitted from the power device to a control device, the control device being associated with a thermostat. The target temperature of the thermostat is temporarily changed to a power-save target temperature in response to the second power-save signal. A third power-save signal is transmitted by the control device to a power-save adapter of an associated energy-consuming unit. Upon receiving the third power-save signal by the power-save adapter, the power-save adapter permits limited operation of the energy-consuming unit and at least substantially prevents operation of the energy-consuming unit for a third period of time. In some examples the method further comprises delaying changing the target temperature to the power-save target temperature for a period of time.

A second example of a method for temporarily reducing energy demand from an energy grid is carried out as follows. A first power-save signal is transmitted to a remotely accessible power device through which power is supplied to a user. The first power-save signal transmitting step occurs before a need to reduce power consumption. The first power-save signal is received by the power device of the user. A second power-save signal is transmitted from the power device to a control device, the control device being associated with a thermostat. The target temperature of the thermostat is temporarily changed to a power-save target temperature in response to the second power-save signal. Changing the target temperature to the power-save target temperature is delayed for a period of time.

An example of an energy control system responsive to a need to reduce energy consumption from an energy grid comprises a power meter, a control device and a thermostat. The power meter is capable of receiving a first power-save signal and generating a second power-save signal. The control device is operably coupled to the power meter to receive the second power-save signal from the power meter. The thermostat is operably coupled to the control device and has a selected target temperature, the selected target temperature being changed to a power-save target temperature in response to receipt of the second power-save signal for at least a target temperature length of time. The control device is capable of creating a third power-save signal in response to the receipt of the second power-save signal. The system also comprises a power-save adapter, for an associated energy-consuming unit, responsive to the third power-save signal. The power-save adapter permits limited operation of the energy-consuming unit and at least substantially prevents operation of the energy-consuming unit for a third period of time in response to the third power-save signal.

Other features, aspects and advantages of the present invention can be seen on review the Figs., the detailed description, and the claims which follow.

BRIEF DESCRIPTION OF THE DRAWINGS

FIG. 1 is an overall, schematically of an energy control system made according to the invention;

FIG. 2 is a schematic view of the main housing of FIG. 1 showing a thermostat and a control device within the main housing.

DETAILED DESCRIPTION OF THE INVENTION

Figure 3:
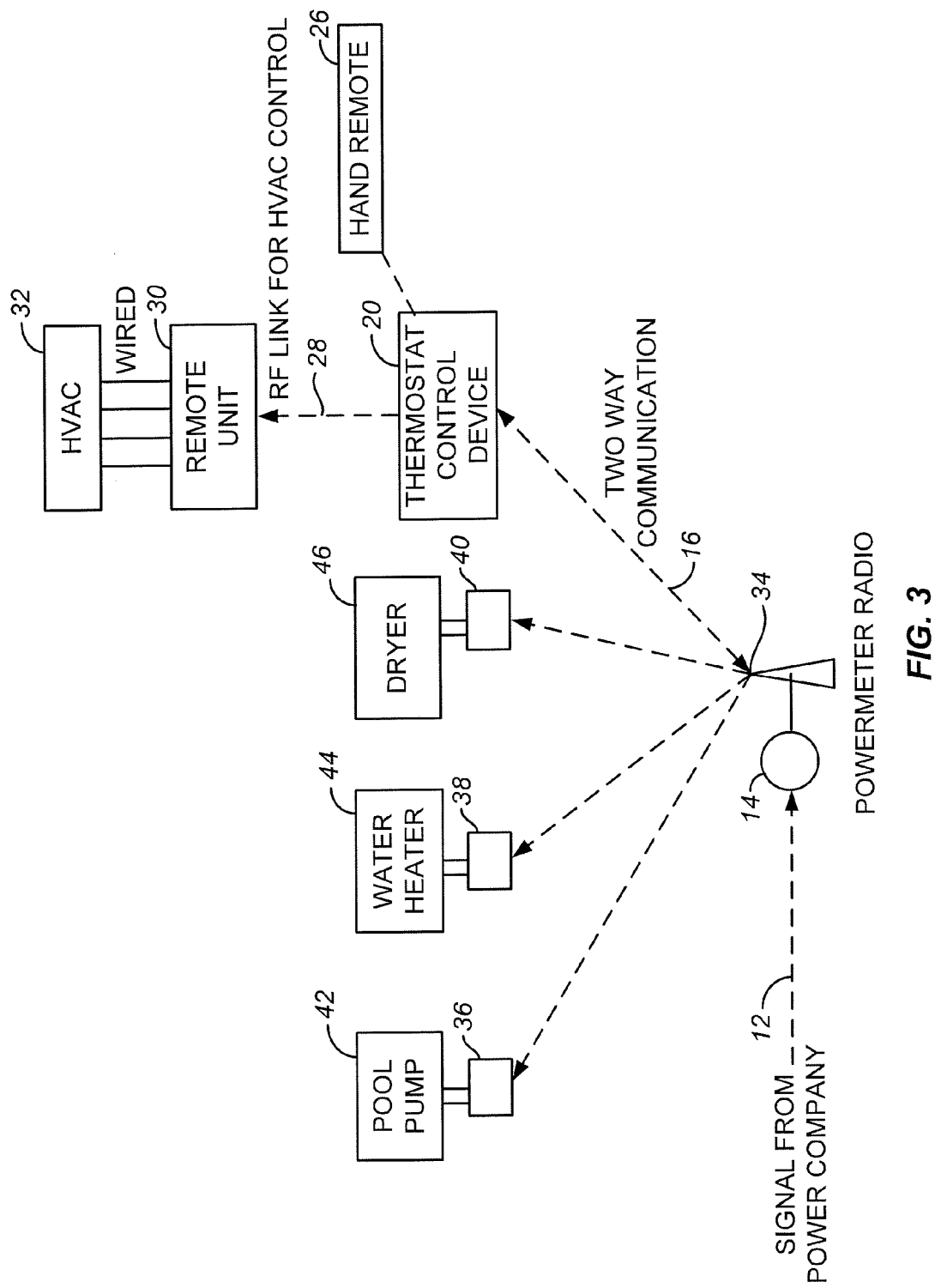
FIG. 3 is a schematic drawing illustrating the signal paths between the various components of the system of FIG. 1.

One aspect of the present invention provides a significant improvement upon the power-save concept described in the Background section. While some embodiments can be used with both heating and air conditioning, in practice they are expected to be used almost exclusively for reducing power loads by air conditioners. Therefore, the heater/cooler, also called the air-conditioner/furnace, will sometimes be referred to below as an air conditioner although the invention is applicable for heating systems, cooling systems and combination heating/cooling systems.

With some embodiments of the invention, instead of immediately increasing the target temperature of the user's air-conditioner during a power-save state, the user's power meter would send a signal to a thermostat made according to the present invention asking the thermostat to change the target temperature by an amount, typically an amount chosen by the power company, such as 3° F., after a delay of, for example, two hours; the particular delay will depend upon when the need for a reduction in load is expected. The power-save state may be for a definite period of time, such as 1 p.m.-5 p.m., or for an indefinite period to be terminated by a power-alert-over signal from the power company.

With some embodiments of the invention, upon receipt of an energy-save signal, the thermostat sends one or more third power-save signals to high energy-consuming units, such as electric water heaters and electric clothes dryers. In some embodiments the system permits limited operation of the energy-consuming unit and then at least substantially prevents operation of the energy-consuming unit for a third period of time. The limited operation will typically permit a user to finish an operating cycle of the energy-consuming unit, such as drying a load of clothes or heating the water in a hot water heater. After the energy-consuming unit has finished the current operating cycle, typically sensed by an appropriate lack of energy use, the appliance will be disabled from beginning a new cycle until the power-save state is over; a maximum time limit for continued use may also be used to help prevent bypassing the system. In some embodiments limited operation can include permitting a user to start an operating cycle for an energy-consuming unit, typically within a period of time, such as 30 minutes, after receipt of the energy-save signal.

In some embodiments a single power-save signal is used, typically 2-4 hours before the start of the power-save state. In other embodiments a preliminary power-save signal can be used before the expected start of the power-save state and a supplemental power-save signal may be used at the actual beginning of the power-save state. In some embodiments the supplemental power-save signal may always be used to start the power-save state and other embodiments the supplemental power-save signal may be used only when it is necessary to start the power-save state earlier or later than provided by the preliminary power-save signal. For example, if the preliminary power-save signal issued at 10 a.m. indicated that the power-save state will start at 1 p.m., then no supplemental power-save signal would be necessary unless it became necessary to change the start of the power-save state to, for example, 12:30 p.m. or 1:30 p.m.

For example, assume the power company sends out a power-save signal at 10 a.m. asking the thermostat to increase the target temperature for the air-conditioner by 3° F. at 11:30 a.m. Assuming the target temperature is originally 78° F., the air-conditioner will likely be running at 11:30 a.m. when the new target temperature of 81° F. is set. This would cause the air-conditioner to immediately turn off thus providing the desired reduction in load to the power grid when and where it is needed. In some embodiments the user can override this automatic changing of the temperature, but would typically lose any rate reduction benefit. In some embodiments the user can override the entire power save system to permit the user to use energy-consuming units during a power-save state; such use would typically cause the user to lose the benefit of any rate reduction and may entail a surcharge or penalty. Also, in some embodiments the system can be set up so that users who start out at an unreasonably low cooling temperature, such as 72° F., would also typically lose any rate reduction benefits; to do so the thermostat would provide a signal to the power company, typically through the power meter, to permit the power company to monitor the target temperature at least just prior to and during a power-save state.

In some embodiments the power company may have two levels of signals, for the purpose of this discussion termed a price event signal and an emergency event signal. If a price event signal is transmitted, the setback in the target temperature, such as 2° F., could be overridden by the user, but likely resulting in a price surcharge. Note that when the term setback is used with reference to air conditioning, it refers to an increase in the target temperature. And If an emergency event signal is transmitted, such as 4° F., the system can be set up so that the user cannot override the setback. For example, assume the thermostat has a target temperature of 75° F. when operating in a cooling mode. A price event signal is transmitted by the power company and tells the thermostat to go to 77° F.; assuming the air conditioner is operating and the sensed temperature is less than or equal to 77° F., the air conditioner shuts off. If the event lasts long enough, the building could heat up to 78° F. which would cause the thermostat to turn the air conditioner back on. If the event is not over and the power company sees the power demand increasing, the power company could transmit an emergency event signal causing the thermostat to be set to 80° F. When the power event is over, the thermostat is restored to its original target temperature by virtue of a period of time elapsing or by virtue of a separate signal being transmitted by the power company. The type of signal can be communicated to the user by, for example, a series of colored lights associated with the thermostat with green indicating normal operation, yellow indicating a price event signal has been received and is currently in effect so that the user can override the setback but with a price surcharge, and red indicating an emergency event signal has been received and is currently in effect so that the user cannot override the setback temperature increase.

The basic concept for an energy control system 10 is illustrated in FIGS. 1, 2 and 3. In some examples the power company 11 sends out an alert, sometimes called first power-save signal 12, which is received by the user's power meter 14. Power-save signal 12 is typically transmitted along electrical lines 13. The user's power meter 14 then sends a second power-save signal 16 to a control device 18 associated with a thermostat. In the example of FIGS. 1, 2 and 3, combination control device 18 includes a common housing 20, containing a thermostat 22 and a control device 24, and a remote control 26. Although thermostat 22 and control device 24 are illustrated as separate devices with a common housing 20, the control circuit of thermostat 22 may incorporate the components of the control device 24 so they would not be easily physically separated. The control device 24 tells the thermostat 22 to change the target temperature by, for example, raising it 3° when the air-conditioner is being used. This can be achieved by the thermostat 22, or the control device 24, sending an appropriate control signal 28 to the HVAC receiver unit 30 which in turn sends an appropriate signal to the HVAC system 32. The alert (the first power-save signal 12) is preferably sent out at least one hour and more preferably at least two hours before the deadline for power reduction. For example, if the power company believes a reduction in power is needed by noon, sending out the alert at 10 a.m. gives the user a two-hour period for limited operation of energy-consuming units.

With some embodiments of the invention the thermostat also sends out third power-save signals 34 to various power-save adapters 36, 38, 40. Each power-save adapter controls the power to an energy-consuming unit, such as a pool heater pump 42, a water heater 44, and an electric clothes dryer 46. The power-save adapter is responsive to the third power-save signal 34 permitting limited operation of the energy-consuming unit and at least substantially preventing operation of the energy-consuming unit for a third period of time, or until receipt of a power-alert-over signal. The power-save adapter could be a separate module or an integral part of the energy-consuming unit. Also, a single power-save adapter may be associated with and control two or more energy-consuming units. For example, upon receiving the third power-save signal by the electric dryer power-save adapter 40, the adapter permits the clothes dryer to relatively promptly start a new drying cycle or to finish any currently running drying cycle, but thereafter at least substantially prevents operation of the clothes dryer for a period of time, such as for six hours or, for example, until 6 p.m, or until receipt of a power-alert-over signal. Also, upon receiving the third power-save signal 34 by the hot water heater power-save adapter 38, the adapter permits the hot water heater to start or to continue to heat the water within the hot water heater but thereafter at least substantially prevents operation of the hot water heater for a water heater period of time, such as for six hours or, for example, until 6 p.m, or until receipt of a power-alert-over signal. Permitting limited operation of the energy-consuming unit during a power-save state helps to reduce the impact on the user from the need to cut power consumption.

One or more of the devices associated with the system may provide an indication of the alert status. For example, in some embodiments the power save adapters and the thermostat each have three colored LEDs, a green LED 50 indicating no power-save signal in effect, a yellow LED 52 indicating a power-save signal has been received but the delay time has not expired (still within the 10 a.m.-12 noon period in the above example), and a red LED 54 indicating a power-save state is currently in effect. The alert status signal may be, for example, visible, audible, electronic, or a combination. They signal would be especially helpful to permit a user to start a new operating cycle and complete it before the start of the power-save state. In the examples in which the power company transmits a price event signal and an emergency event signal, a green LED can indicate normal operation, a yellow LED can indicate a price event signal has been received and is currently in effect, and a red LED can indicate an emergency event signal has been received and is currently in effect.

The thermostat 22 discussed above with regard to the invention is very similar to the RiteTemp™ 6020Z mentioned above. This thermostat is a relatively simple thermostat that can be placed in a heating mode or a cooling mode, with 2 heating and 2 cooling settings, or turned off. The fan can be set in an automatic setting, so that the fan operates when the air conditioner or furnace is operating, or in a continuously-on setting. Of course other appropriately constructed thermostats can also be used. Although the present invention is expected to find its greatest utility with thermostats and systems using wireless communication protocols, it could be used with systems that are completely hardwired or a combination of hardwired and wireless.

In some examples it may be desirable for various wireless devices to mate with other devices using the device recognition method, sometimes referred to as Device Mating procedure, disclosed in U.S. patent application Ser. No. 11/692,827 entitled Device Recognition Method filed on 28 Mar. 2007, publication no. US-2007-0230962-A1, the disclosure of which is incorporated by reference. Briefly, the device recognition system disclosed in patent application Ser. No. 11/692,827 permits the user to synch and link to one or more devices through intimate contact, preferably using magnets, as (a) a mechanical means to show the user that the two or more devices are connected, and (b) as a means for transferring handshake information between or among the devices to permit appropriate signal recognition between or among the devices. The process involves having two devices connect to each other by actuating control elements on one device and on another device. The control device can include, for example, a mechanical button or a magnetic switch or magnets pulling two devices together. Some embodiments use magnets to give the user a positive indication in an extremely simple, visible, tactile and auditory way that the devices are properly connected to one another. However, other types of mating features, such as plug and socket types of connections, can also be used.

In addition to signaling the energy alert status received from the power company, the alert LEDs 50, 52, 54 on the thermostat, as well as other components such as power save adapters 36, 38, 40 and the HVAC receiver unit 30, can be used to signal for other conditions. For example, a remotely placed water sensor could be used to provide a signal to a pump controller indicating whether the pump is to be running or not. The pump controller could provide a signal to the thermostat 22, or some other component including alert LEDs, of the pumping status, such as the pump is running, the pump is clogged, the pump is off, or the pump needs to be checked. In addition, the alert LEDs could be used to signal the status of other things, such as mail has been received in a mailbox, a doorbell has been rung or a garage door has been opened. Such multiple uses for the LEDs, or other signaling devices, could be accomplished by using an alert select switch, or by programming the alert LEDs to have different illumination patterns for different alerts, or by doing both. For example, the alert LEDs 50,52,54 could be designed to stay constantly illuminated for power save statuses, to have the green LED 50 blink for a mail received status, to have the yellow LED 52 blink for a doorbell rung status and to have the red LED 54 blink when the garage door has been opened.

It is presently preferred that the various components shown in FIG. 1 communicate using the Zigbee communications protocol with certain enhancements discussed below. Zigbee is the name of a specification for a suite of high level communication protocols using small, low-power digital radios based on the IEEE 802.15.4 standard for wireless personal area networks (WPANs). The relationship between IEEE 802.15.4-2003 and Zigbee is similar to that between IEEE 802.11 and the Wi-Fi Alliance. The Zigbee 1.0 specification was ratified on Dec. 14, 2004 and is available to members of the Zigbee Alliance. Zigbee operates in the industrial, scientific and medical (ISM) radio bands; 868 MHz in Europe, 915 MHz in the USA and 2.4 GHz in most jurisdictions worldwide. Additional information on the Zigbee protocol can be found at www.Zigbee.org. The present invention may be practiced using a conventional Zigbee protocol, an enhanced Zigbee protocol or some other appropriate communications protocol Other modification and variation can be made to the disclosed embodiments without departing from the subject of the invention as defined in following claims.

Any and all patents, patent applications, and printed publications referred to above are incorporated by reference.

What is claimed is:

1. A method for temporarily reducing energy demand on an energy grid comprising:
  receiving a first power-save signal by a power meter of a user, the power meter being a remotely accessible power meter through which power is supplied to the user, the first power-save signal being received before a need to reduce power consumption;
  transmitting a second power-save signal from the power meter to a control device, the control device associated with a thermostat;
  changing a target temperature of the thermostat to a power-save target temperature in response to the second power-save signal;
  transmitting a third power-save signal by the control device to a power-save adapter of an associated energy-consuming unit;
  and upon receiving the third power-save signal by the power-save adapter, the power-save adapter permitting operation of the energy-consuming unit for a first period of time and at least substantially preventing operation of the energy-consuming unit following the first period of time.

2. The method according to claim 1 wherein the changing step further comprises delaying changing the target temperature to the power-save target temperature for a second period of time in response to the second power-save signal.

3. The method according to claim 2 wherein the first power-save signal contains an instruction to delay changing the target temperature for said second period of time.

4. The method according to claim 1 wherein the first power-save signal is received at least 1 hour before the need to reduce power consumption.

5. The method according to claim 1 wherein the first power-save signal receiving step and the second power-save signal transmitting step are wireless signal receiving and transmitting steps.

6. The method according to claim 1 wherein the second power-save signal transmitting step is carried out with the control device and the thermostat within a common housing.

7. The method according to claim 1 wherein the power save adapter is separable from the energy-consuming unit.

8. The method according to claim 1 further comprising providing a user indication that a power-save condition exists by at least one of the thermostat, the control device, and the energy-consuming unit.

9. The method according to claim 1 wherein:
the third power-save signal transmitting step is carried out with the energy-consuming unit comprising a clothes dryer; and
upon receiving the third power-save signal by the power-save adapter, the power-save adapter permits finishing any currently running drying cycle of the clothes dryer during said first period of time and thereafter at least substantially prevents operation of the clothes dryer for at least a third period of time.

10. The method according to claim 9 wherein upon receiving the third power-save signal by the power-save adapter, the power-save adapter also permits starting, within a time period after receiving the third power-save signal, a new drying cycle of the clothes dryer during said first period of time and thereafter at least substantially prevents operation of the clothes dryer during said third period of time.

11. The method according to claim 1 wherein:
the third power-save signal transmitting step is carried out with the energy-consuming unit comprising a hot water heater; and
upon receiving the third power-save signal by the power-save adapter, the power-save adapter permits the hot water heater to heat the water within the hot water heater during said first period of time and thereafter at least substantially prevents operation of the hot water heater during a third period of time.

12. The method according to claim 1 further comprising providing a user indication that a power-save condition exists.

13. A method according to claim 1 wherein the first power-save signal receiving step is carried out using electric power consumption meter as the power meter.

14. A method for temporarily reducing energy demand on an energy grid comprising:
receiving a first power-save signal by a power meter of a user, the power meter being a remotely accessible power meter through which power is supplied to the user, the first power-save signal being received before a need to reduce power consumption;
transmitting a second power-save signal from the power meter to a control device, the control device associated with a thermostat;
changing a target temperature of the thermostat to a power-save target temperature in response to the second power-save signal; and
delaying changing the target temperature to the power-save target temperature for a second, chosen period of time.

15. The method according to claim 14 wherein the first power-save signal is a price event power-save signal; and
optionally overriding the first power-save signal by the user.

16. The method according to claim 15 further comprising:
receiving a supplemental first power-save signal by the power meter, the supplemental first power-save signal being an emergency event power-save signal;
transmitting a supplemental second power-save signal from the power meter to the control device; temporarily changing the target temperature of the thermostat to a supplemental power-save target temperature in response to the supplemental second power-save signal; and preventing the user from overriding the supplemental first power-save signal.

17. An energy control system responsive to a need to reduce energy consumption from an energy grid comprising:
a power meter capable of receiving a first power-save signal and generating a second power-save signal;
a control device operably coupled to the power meter to receive the second power-save signal from the power meter;
a thermostat operably coupled to the control device and having a selected target temperature, the selected target temperature being changed to a power-save target temperature in response to receipt of the second power-save signal for at least a first length of time;
the control device capable of creating a third power-save signal in response to the receipt of the second power-save signal; and
a power-save adapter, for an associated energy-consuming unit, responsive to the third power-save signal, the power-save adapter permitting operation of the energy-consuming unit for a second period of time and at least substantially preventing operation of the energy-consuming unit until after said second period of time in response to the third power-save signal.

18. A system according to claim 17 wherein the power meter is an electric power meter, and the thermostat and the control device are in a common housing.

19. The system according to claim 17 wherein the power-save adapter is adapted to permit the energy-consuming unit to operate during said second period of time, and thereafter at least substantially prevent operation of the energy-consuming unit for at least a third period of time.

20. The system according to claim 17 wherein the energy-consuming unit comprises a clothes dryer and the power-save adapter for the clothes dryer is adapted to permit the clothes dryer to finish any currently running drying cycle during said second period of time and thereafter at least substantially prevent operation of the clothes dryer for at least a third period of time.

21. The system according to claim 20 wherein the power save adapter is also adapted to permit a new drying cycle to begin, during said second period of time following receipt of the third power-save signal, a new drying cycle, and after the second period of time at least substantially prevent operation of the clothes dryer for at least a third period of time.

22. The system according to claim 17 wherein the energy-consuming unit comprises a hot water heater and the power-save adapter for the hot water heater is adapted to permit the hot water heater to heat the water within the hot water heater during said second period of time and thereafter at least substantially prevent operation of the hot water heater during at least a third period of time.

23. The system according to claim 17 further comprising a user indication of a power-save condition in response to receipt of the third power-save signal by the power-save adapter for the energy consuming unit.

24. The system according to claim 17 further comprising a user indication of a power-save condition.

25. The system according to claim 24 wherein the user indication is provided in response to receipt of the second power-save signal.

* * * * *